(12) United States Patent
Shelke et al.

(10) Patent No.: US 12,671,612 B1
(45) Date of Patent: Jun. 30, 2026

(54) MULTI-TAP DECISION FEEDBACK EQUALIZER (DFE) TRAINING IN A MEMORY PHYSICAL (PHY) LAYER

(71) Applicant: Cadence Design Systems, Inc., San Jose, CA (US)

(72) Inventors: Anirudha Anil Shelke, Pune (IN); Avinash Ugrappa, Bengaluru (IN); Ashwin S. M., Kerala (IN); Venkata Mahesa Thorata, Toronto (CA); Mahabaleshwara Maha, Benagalura Karnataka (IN)

(73) Assignee: Cadence Design Systems, Inc., San Jose, CA (US)

( * ) Notice: Subject to any disclaimer, the term of this patent is extended or adjusted under 35 U.S.C. 154(b) by 72 days.

(21) Appl. No.: 18/795,692

(22) Filed: Aug. 6, 2024

Related U.S. Application Data

(60) Provisional application No. 63/578,896, filed on Aug. 25, 2023.

(51) Int. Cl.
H04L 25/03 (2006.01)
(52) U.S. Cl.
CPC .................. H04L 25/03267 (2013.01); H04L 2025/03636 (2013.01)
(58) Field of Classification Search
CPC ............... H04L 25/025; H04L 25/0256; H04L 25/03006; H04L 25/03019; H04L 25/03057; H04L 25/03254; H04L 25/03267; H04L 25/03885; H04L 2025/03636; H04L 25/03636
USPC ....... 375/231–233, 346, 348, 350; 333/28 R; 708/322, 323
See application file for complete search history.

(56) References Cited

U.S. PATENT DOCUMENTS

| | | | | |
|---|---|---|---|---|
| 9,160,582 | B1 * | 10/2015 | Huss | H04L 7/033 |
| 9,565,037 | B1 * | 2/2017 | Liu | H04L 25/03057 |
| 2010/0220828 | A1 * | 9/2010 | Fuller | H03F 3/45179 375/355 |
| 2017/0279428 | A1 * | 9/2017 | Malhotra | H04L 25/03114 |
| 2023/0100177 | A1 * | 3/2023 | Levin | G06F 13/4221 375/232 |

* cited by examiner

*Primary Examiner* — Young T. Tse
(74) *Attorney, Agent, or Firm* — Mark H. Whittenberger; Holland & Knight LLP

(57) ABSTRACT

Technologies for optimizing multi-tap Decision Feedback Equalizer (DFE) training in the memory physical (PHY) layer may be described. A receiver circuit includes analog and digital circuitry. The analog circuitry includes a single de-serializer and a set of DFE taps. The digital circuitry includes a register to store a copy of a set of training patterns. The digital circuitry performs byte alignment using a first training pattern. The digital circuitry may match error bits received from the single de-serializer with data bits of the copy of the set of training patterns. The digital circuitry may calibrate the set of DFE taps using the error bits and the data bits.

17 Claims, 13 Drawing Sheets

• Eye diagrams without & with DFE with all the voltage noise added (supply noise & xtalk etc) to clearly show the margin achieved using DFE.

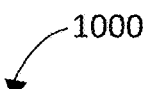

1000

RECEIVE, FROM A DYNAMIC RANDOM ACCESS MEMORY (DRAM) DEVICE, A FIRST TRAINING PATTERN IN A FIRST STAGE OF A TRAINING MODE OF THE RECEIVER CIRCUIT 1002

PERFORM BYTE ALIGNMENT USING THE FIRST TRAINING PATTERN IN THE FIRST STAGE 1004

RECEIVE A PLURALITY OF TRAINING PATTERNS IN A SECOND STAGE OF THE TRAINING MODE 1006

MATCH ERROR BITS, CORRESPONDING TO FIRST DATA BITS OF THE PLURALITY OF TRAINING PATTERNS RECEIVED FROM THE DRAM DEVICE, WITH SECOND DATA BITS OF A COPY OF THE PLURALITY OF TRAINING PATTERNS STORED AT THE RECEIVER CIRCUIT 1008

CALIBRATE A PLURALITY OF DECISION FEEDBACK EQUALIZER (DFE) TAPS OF THE RECEIVER CIRCUIT USING THE ERROR BITS AND THE SECOND DATA BITS 1010

FIG. 10

MULTI-TAP DECISION FEEDBACK EQUALIZER (DFE) TRAINING IN A MEMORY PHYSICAL (PHY) LAYER

RELATED APPLICATIONS

This application claims the benefit of U.S. Provisional Application No. 63/578,896, filed 25 Aug. 2023, the entire contents of which may be incorporated herein by reference.

BACKGROUND

Multi-tap Decision Feedback Equalizers (DFEs) may be a type of equalization technique used in digital communication systems to mitigate the effects of intersymbol interference (ISI). ISI may occur when symbols transmitted over a communication channel interfere with each other, causing errors in the received signal. DFEs may be used to estimate and remove in a current symbol the interference caused by previously transmitted symbols. A DFE may be a single-tap DFE or a multi-tap DFE. In situations, where the channel introduces significant distortion or long tails of ISI, a single-tap DFE may not be sufficient to adequately equalize the received signal.

To address this, multi-tap DFEs employ multiple taps or filter coefficients to estimate the interference caused by multiple previously transmitted symbols. Each tap corresponds to a different delay element in the filter, representing a different symbol period in the past. The filter coefficients associated with each tap may be adaptively adjusted to minimize residual interference.

SUMMARY

In one or more embodiments of the present disclosure, a receiver circuit of a physical layer (PHY) of a memory controller is provided. The receiver circuit may include a data path to receive a signal from a dynamic random access memory (DRAM) device at a data pin over a channel. The data path may comprise a plurality of decision feedback equalizer (DFE) taps and only one de-serializer block to produce received data. The receiver circuit may also include digital logic coupled to the data path, where the digital logic may perform byte alignment by comparing the received data with the first data stored in a register of the digital logic, where the plurality of DFE taps may be calibrated by comparing the received data with second data stored in the register, where the digital logic may comprise a counter to select portions of the second data for comparisons with the received data.

One or more of the following features may be included. The first data may comprise a toggling pattern. The second data may comprise a plurality of predefined patterns. The plurality of DFE taps may be calibrated by a sign-sign least mean squares (SSLMS) algorithm. The receiver circuit may continuously read from a first-in-first-out (FIFO) of the DRAM device, the FIFO storing a plurality of predefined patterns, wherein the register may store a copy of the plurality of predefined patterns. The data path may further include an analog front-end (AFE) circuit to receive the signal from the DRAM device, a data slicer, an error slicer, and a multiplexer coupled to the data slicer and the error slicer, where the multiplexer may select an output of the error slicer in a training mode in which the plurality of DFE taps may be calibrated. The data path may further include an analog front-end (AFE) circuit to receive the signal from the DRAM device, a first data slicer, a second data slicer, a first error slicer, a second error slicer, a first multiplexer coupled to the first data slicer and the first error slicer, and a second multiplexer coupled to the second data slicer and the second error slicer, where the first multiplexer is to select an output of the first error slicer and the second multiplexer may select an output of the second error slicer in a training mode in which the plurality of DFE taps may be calibrated, where the de-serializer block may be a 2:N de-serializer block, where N may be a positive integer greater than two. The digital logic may include a sign-sign least mean squares (SSLMS) core that may implement an SSLMS algorithm. Alignment logic may perform the byte alignment, the alignment logic to output the received data, and an indicator that may indicate that the received data may be byte aligned, where the received data may comprise error bits received from the de-serializer block. Matching logic may receive the received data and the indicator from the alignment logic, the matching logic may match the error bits with data bits of the second data stored in the register, the matching logic may output cycle-to-cycle matched error bits and data bits to the SSLMS core.

In one or more embodiments of the present disclosure, a receiver circuit is provided. The receiver circuit may include analog circuitry having a single de-serializer and a plurality of decision feedback equalizer (DFE) taps, where during a training mode of the receiver circuit, the analog circuitry may receive a first training pattern in a first stage of the training mode and a plurality of training patterns in a second stage of the training mode. The receiver circuit may further include digital circuitry coupled to the analog circuitry, the digital circuitry having a register to store a copy of the plurality of training patterns. The digital circuitry may perform byte alignment using the first training pattern in the first stage. In the second stage, the digital circuitry may match error bits received from the single de-serializer with data bits of the copy of the plurality of training patterns. In the second stage, the digital circuitry is to calibrate the plurality of DFE taps using the error bits and the data bits.

One or more of the following features may be included. The digital circuitry may include a sign-sign least mean squares (SSLMS) core that may implement an SSLMS algorithm to calibrate the plurality of DFE taps. Alignment logic to perform the byte alignment, where the alignment logic may output the error bits and a byte-aligned indicator. Matching logic may receive the error bits and the byte-aligned indicator from the alignment logic, where the matching logic may match the error bits with the data bits of the copy of the plurality of training patterns stored in the register, where the matching logic may output the matching error bits and data bits to the SSLMS core. The digital circuitry may include a register to store first data and second data, where the first data may include the first training pattern, where the second data may include the plurality of training patterns, where the digital circuitry may perform the byte alignment by comparing first received data with the first data stored in the register, and where the digital circuitry may calibrate the plurality of DFE taps by comparing second received data with the second data stored in the register. The digital circuitry may also include a counter to sequentially select each training pattern of the plurality of training patterns stored in the register for comparison with the second received data. The receiver circuit may sequentially read the plurality of training patterns from a first-in-first-out (FIFO) of a dynamic random access memory (DRAM) device. The first training pattern may include a toggling sequence of bits, and where the plurality of training patterns may include different predefined sequences of bits. The analog circuitry may further include an analog front-end (AFE) circuit to receive a signal from a dynamic random access memory (DRAM) device, a data slicer, an error slicer, and a multiplexer coupled to the data slicer and the error slicer, where the multiplexer may select an output of the error slicer in a training mode in which the plurality of DFE taps may be calibrated. The analog circuitry may further include an analog front-end (AFE) circuit to receive a signal from a dynamic random access memory (DRAM) device, a first data slicer, a second data slicer, a first error slicer, a second error slicer, a first multiplexer coupled to the first data slicer and the first error slicer, and a second multiplexer coupled to the second data slicer and the second error slicer, where the first multiplexer may select an output of the first error slicer and the second multiplexer may select an output of the second error slicer in a training mode in which the plurality of DFE taps may be calibrated, where the de-serializer block may be a 2:N de-serializer block, where N may be a positive integer greater than two.

In one or more embodiments of the present disclosure, a system is provided. The system may include a dynamic random access memory (DRAM) device comprising a first-in-first-out (FIFO) to store a plurality of training patterns, where the DRAM device may send first data bits of the plurality of training patterns, and a memory controller coupled to the DRAM device via a channel, where memory controller may include a register to store a copy of the plurality of training patterns. The memory controller may include analog circuitry having a single de-serializer and a plurality of decision feedback equalizer (DFE) taps, the single de-serializer may only provide error bits corresponding to the first data bits received from the DRAM device. The system may further include digital circuitry coupled to the analog circuitry, where the digital circuitry may perform byte alignment using a toggling pattern, and where the digital circuitry may calibrate the plurality of DFE taps using the error bits received from the single de-serializer and matching second data bits of the copy of the plurality of training patterns stored in the register.

One or more of the following features may be included. The digital circuitry may include a counter to sequentially select each training pattern of the plurality of training patterns stored in the register. The digital circuitry may include a sign-sign least mean Squares (SSLMS) core that implements an SSLMS algorithm to calibrate the plurality of DFE taps, where alignment logic may perform the byte alignment, where alignment logic may output the error bits and a byte-aligned indicator. Matching logic may receive the error bits and the byte-aligned indicator from the alignment logic, where the matching logic may match the error bits with the second data bits of the copy of the plurality of training patterns stored in the register, where the matching logic may output the error bits and the matching second data bits. The analog circuitry may further include an analog front-end (AFE) circuit to receive a signal from the DRAM device, a first data slicer, a second data slicer, a first error slicer, a second error slicer, a first multiplexer coupled to the first data slicer and the first error slicer, and a second multiplexer coupled to the second data slicer and the second error slicer, where the first multiplexer may select an output of the first error slicer and the second multiplexer may select an output of the second error slicer in a training mode in which the plurality of DFE taps may be calibrated. The de-serializer block may be a 2:N de-serializer block, where N may be a positive integer greater than two.

Additional features and advantages of embodiments of the present disclosure may be set forth in the description which follows, and in part may be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description may be exemplary and explanatory and may be intended to provide further explanation of embodiments of the invention as claimed.

BRIEF DESCRIPTION OF THE DRAWINGS

The present disclosure is illustrated by way of example, and not by way of limitation, in the figures of the accompanying drawings.

FIG. 10 is a flow diagram of a method for calibrating multiple DFE taps according to at least one embodiment.

DETAILED DESCRIPTION

Figure 1:
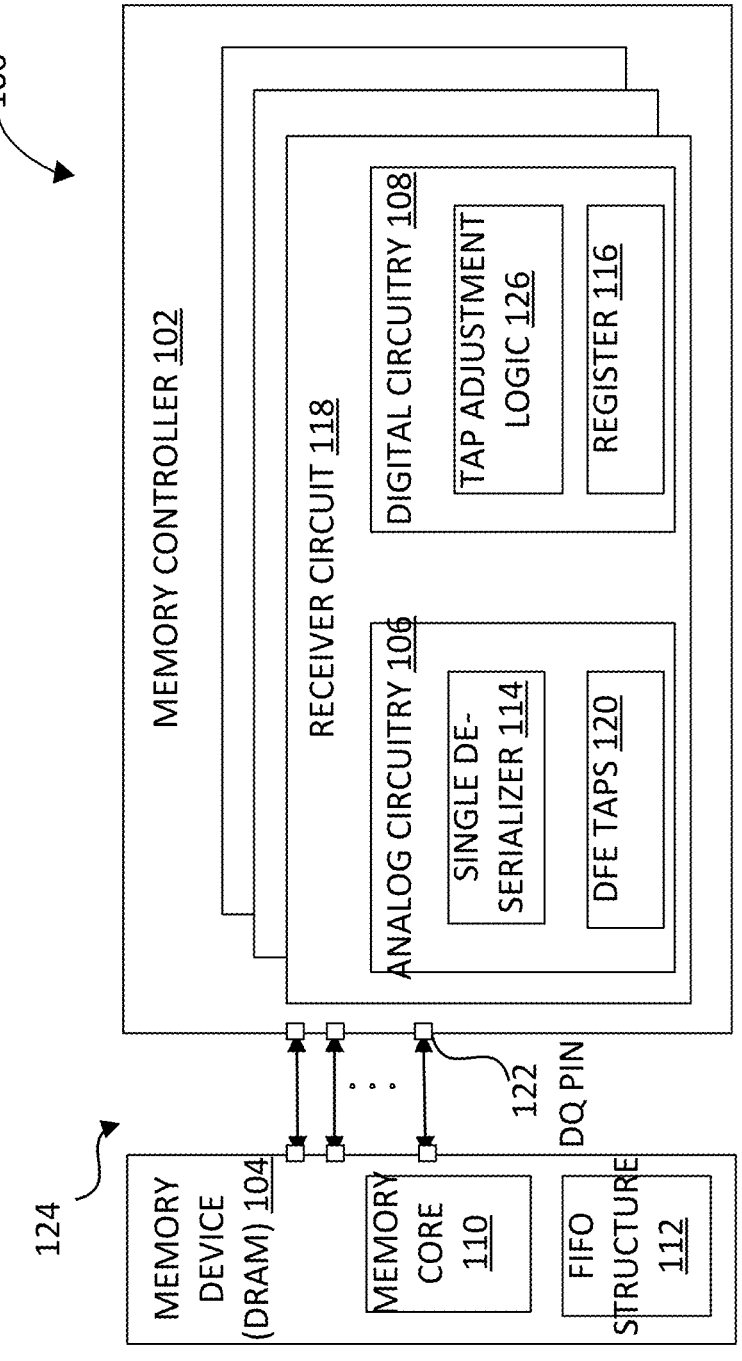
FIG. 1 is a block diagram of a memory system with a memory controller having a single de-serializer and digital circuitry for calibrating multiple DFE taps according to at least one embodiment.

The multi-tap DFE architecture described herein may be half-rate first tap (tap1) speculative. The DFE uses tap1 speculation to ease the tap1 timing requirements. This means that the DFE applies the tap 1 correction on the current received signal for both possible cases of the previous symbol being 1 and the previous symbol being 0 and then slices the correction for each case. The sign of the previous symbol may then be used to select the correct result. Only tap1 may be speculative in nature. Further, the estimated symbol sequence may be passed through another set of taps (taps other than tap1) to create an estimate of the interference that may be caused on the current symbol by the previous symbols. This estimated interference or other taps corrections may be applied on the current received signal to further reduce the ISI. The tap coefficients of the multi-tap DFE may be typically adapted using algorithms such as the least mean squares (LMS) or recursive least squares (RLS) to continually update and optimize their values based on the received signal characteristics.

By incorporating multiple taps, multi-tap DFEs may be capable of effectively equalizing signals in channels with more severe ISI. They may offer improved performance compared to single-tap DFEs and may be commonly employed in communication systems such as digital subscriber lines (DSL), wireless communication, and high-speed data transmission.

Technologies for optimizing multi-tap DFE training in the memory physical layer may be described. Conventional dynamic random access memory (DRAM) interfaces, operating at a lower speed per data pin (DQ pin), may use a single-tap filter in a DFE to estimate and remove the interference caused by previously transmitted symbols. DRAM interfaces, like Graphics Double Data Rate 6 (GDDR6) may achieve higher speeds. In a GDDR6 memory physical layer (PHY), a maximum speed of 24 Gbps per data pin (DQ pin) may be targeted. DQ pins may be used for data input and output. These higher speeds may introduce significant distortion or long tails of ISI. At this data rate of 24 Gbps, the channel ISI effect may increase compared to previous generations operating at data rates of 16/18 Gbps, because of the increase in the number and magnitude of post-cursor ISI. Post-cursor ISI occurs when symbols from the current or previous time interfaces may affect the symbols in future intervals, causing overlapping and distortion. Thus, a single-tap DFE may not be sufficient to adequately equalize the received signal in some DRAM interfaces.

These faster DRAM interfaces may need multi-tap DFEs, instead of a single-tap DFE, to cancel the ISI effect and improve received eye quality. DFE taps of a multi-tap DFE may be adapted using a sign-sign least mean squares (SSLMS) algorithm. The SSLMS algorithm may be an adaptive filtering algorithm commonly used in digital signal processing applications. It may be an extension of the standard LMS (Least Mean Squares) algorithm, specifically designed for systems with sparse or selective tap sets.

In many practical scenarios, the impulse response of a channel or system may exhibit sparsity, meaning that only a subset of taps may contribute significantly to the overall system response. The SSLMS algorithm may take advantage of this sparsity by adaptively updating a selected set of taps rather than updating all taps in the filter. The SSLMS algorithm may initialize the filter taps and other parameters. The initial tap values may be typically set to zero or small random values. The SSLMS algorithm may select a subset of taps to update based on their significance or contribution to the system response. This may be done using various criteria, such as energy or magnitude-based selection, correlation analysis, or prior knowledge of the system. The SSLMS algorithm may update only the selected taps using the standard LMS update equation. The update equation may compute the error between the desired signal and the output of the filter and adjust the tap weights accordingly. However, for the non-selected taps, their weights may remain unchanged. The SSLMS algorithm may adjust the step size parameter or learning rate of the algorithm to control the speed of convergence and stability. This parameter may affect the rate at which the tap weights may be updated and may be tuned based on the specific application requirements. The SSLMS algorithm may iteratively repeat the tap selection and filter update process until the desired convergence criteria may be met, or the algorithm reaches a predetermined number of iterations. The advantage of the SSLMS algorithm may be that it reduces the computational complexity compared to updating all taps, especially when the tap set is sparse. By focusing the adaptation on the significant taps, it may achieve faster convergence and improved performance in sparse channel or system scenarios.

As described above, the correlation between error and data bits may need to be performed in the SSLMS algorithm. Conventional DFEs may use two data paths per DQ pin, one data path for the data and another data path for the error to support the SSLMS algorithm. Also, previous ways of sweeping codes and finding the optimal tap value as in a single-tap DFE system may not be feasible when the memory PHY needs to support multi-tap DFE adaptation. There may be a need for SSLMS algorithm to adapt the multiple taps for which correlation between error bits and data bits may be needed to figure out the equalization status Aspects and embodiments of the present disclosure may address the above and other deficiencies by providing optimizing training for multiple DFE taps by providing matching error and data bits to a tap adjustment algorithm, such as the SSLMS algorithm, without the need for separate error and data paths in the circuit. Aspects and embodiments of the present disclosure may provide one de-serialization path in the circuit due to area limitations in the memory PHY employing the multi-tap DFE. Aspects and embodiments of the present disclosure may be used in memory systems that achieve higher speeds, such as 24 Gbps per data pin (DQ pin) in GDDR6. Aspects and embodiments of the present disclosure may also be used in other memory PHYS, such as DDR5, LPDDR5, LPDDR5x, or the like. In addition to achieving higher speeds and removing the ISI with the multi-tap DFE, the aspects, and embodiments of the present disclosure may save on the area and power of the circuit since only a single datapath is used for both data and error bits. Aspects and embodiments of the present disclosure may provide only one de-serialization data path, alignment logic, and matching logic may be used to help feed cycle-to-cycle matching error and data bits to the tap adjustment algorithm (e.g., SSLMS algorithm). The tap adjustment algorithm may use the matching error and data bits for correlation in adjusting one or more taps of a multi-tap DFE. The matching error and data bits may be fed to other systems to make other adjustments to a receiver circuit.

Aspects and embodiments of the present disclosure may provide a first-in-first-out (FIFO) infrastructure in a memory device (e.g., DRAM device) for training purposes. Custom patterns may be loaded into the FIFO and read from the FIFO by the memory controller while training the DFE taps. Logic may use a select signal to control multiplexer circuitry to feed either error bits or data to a single de-serialization path. The data bits of the custom patterns may be read from the FIFO, but only error bits may be fed to the single de-serialization path during training (also referred to as "tap adaptation"). During tap adaptation, the data bits may need to be byte aligned. The alignment logic, also known as byte levelization, may be used to align the data bits. For this byte alignment, a toggling pattern (toggling sequence of 1's and 0's) may be used. The toggling pattern may be stored in the FIFO in addition to the custom patterns. Alternatively, the pattern may be a mix of a toggling pattern and a unique pattern. The same custom patterns of data bits may be stored in a register or a set of registers in the receiver circuit. During tap adaptation, the data bits may be fed to the tap adjustment algorithm from the register(s) instead of the data bits read from the FIFO. The receiver circuit may match the error bits with the data bits from the register(s) cycle for cycle. The cycle-to-cycle matched error and data bits may be fed to the tap adjustment algorithm for tap adaptation.

Advantages of the present disclosure include but may be not limited to area and power savings, increased transfer speeds, and improved margins in the digital signal's quality and performance, as represented in eye diagrams.

FIG. 1 is a block diagram of a memory system 100 with memory controller 102 having single de-serializer 114 and multiple DFE taps 120 according to at least one embodiment. Memory system 100 may include memory controller 102 and memory device 104. Memory device 104 may be a DRAM device. Alternatively, the memory device 104 may be other memory device types. Memory controller 102 may be coupled to memory device 104 with data bus 124 and a command and address bus (not illustrated in FIG. 1). Data bus 124 may include one or more channels coupled between data pins on the respective device. The data pins may be bidirectional and may be referred to as DQ pins. Memory device 104 may include a memory core 110. Memory core 110 may refer to a central part of memory device 104 that stores and retrieves data. Memory core 110 may include a series of memory cells organized in rows and columns. The structure and organization of memory core 110 may vary based on the type of memory technology used, such as DRAM, Static Random-Access Memory (SRAM), Flash memory, and others. Each memory type may have its own characteristics, benefits, and limitations. Memory core 110 in a DRAM device may include an array of capacitors, with each capacitor representing a memory cell. The charge stored in the capacitor determines the data (0 or 1) stored in that cell. DRAM may be used as the main memory in computers and other digital devices due to its relatively high density and lower cost compared to other memory types. Memory core 110 in an SRAM, for example, may use flip-flops to store data, where each flip-flop represents a single memory cell, and it holds data in a stable state as long as power is supplied to the device. Memory core 110 in a flash memory device may be based on a different technology that uses floating-gate transistors to store data. Flash memory may be non-volatile, meaning it may retain data even when power is removed. It may be widely used in USB drives, memory cards, solid-state drives (SSDs), and other portable storage devices. The characteristics of memory core 110, such as capacity, speed, endurance, and power consumption, may significantly impact the overall performance and capabilities of memory device 104. Different memory technologies may be chosen based on the specific requirements of a particular application, considering factors such as cost, speed, power consumption, and volatility of the data storage. As described in more detail herein, memory device 104 may also include FIFO structure 112 that may store multiple training patterns for training DFE taps 120. In other embodiments, the multiple training patterns may be stored in other structures of memory device 104. In at least one embodiment, FIFO structure 112 may be a separate structure from memory core 110. In other embodiments, the training patterns may be stored in memory core 110.

In at least one embodiment, memory controller 102 may include one or more receiver circuits for each data pin of the data bus 124. As illustrated, receiver circuit 118 may be coupled to data pin 122 (DQ pin). Receiver circuit 118 may include analog circuitry 106 and digital circuitry 108. Analog circuitry 106 may include multiple DFE taps 120 and single de-serializer 114. Digital circuitry 108 may include tap adjustment logic 126 and register 116. It should be noted that register 116 may be one or more registers. Tap adjustment logic 126 may be digital logic that adjusts DFE taps 120, as described in more detail below. Register 116 may store a copy of the multiple training patterns stored in FIFO structure 112. Storing the copy of the multiple training patterns in register 116 may enable the use of the single de-serializer 114. As described herein, single de-serializer 114 may provide the error bits, corresponding to the data bits of the multiple training patterns received from memory device 104, to the digital circuitry 108. The error bits may be matched to the data bits of the training patterns stored in register 116 by the tap adjustment logic 126. The matched error and data bits may further be used by tap adjustment logic 126 to adjust one or more DFE taps 120.

In at least one embodiment, receiver circuit 118 may be a part of the memory controller physical layer (PHY). Receiver circuit 118 may include a data path to receive a signal from memory device 104 at data pin 122 over a channel. The data path includes DFE taps 120 and single de-serializer 114 to produce received data. Memory controller 102 may include a single de-serializer block per each DQ pin. Tap adjustment logic 126 may be coupled to the data path. Tap adjustment logic 126 may perform byte alignment (also referred to as byte levelization) by comparing the received data with first data stored in register 116. The first data may be a toggling pattern. As described herein, DFE taps 120 may be calibrated by comparing the received data with second data stored in register 116. The second data may be multiple predefined patterns (i.e., training patterns). The predefined patterns may be different predefined sequences of 1's and 0's. In at least one embodiment, tap adjustment logic 126 includes a counter. The counter may be used to select portions of the second data in register 116 for comparisons with the received data. That is, the counter may sequentially select each of the predefined patterns stored in the register 116. Receiver circuit 118 may continuously read from the predefined patterns from the FIFO structure 112. Memory device 104 may send the predefined patterns. Analog circuitry 106 may provide the error bits corresponding to the data bits of the predefined patterns received from FIFO structure 112 to the tap adjustment logic 126. Tap adjustment logic 126 may match the data bits from the predefined patterns stored in register 116 with the error bits. Tap adjustment logic 126 may use the matched error and data bits to adjust one or more of DFE taps 120.

In at least one embodiment, tap adjustment logic 126 may include a sign-sign least mean squares (SSLMS) core that implements an SSLMS algorithm. In another embodiment, tap adjustment logic 126 may include logic that implements other tap adjustment algorithms, such as algorithms to adjust low-frequency gain and high-frequency gain of a continuous-time linear equalizer (CTLE). In other embodiments, the error and data bits may be used for other purposes than tap adjustments, such as adjusting gains of a CTLE. In at least one embodiment, tap adjustment logic 126 may include alignment logic and matching logic. The alignment logic may perform byte alignment. The alignment logic may receive data, such as the toggling pattern, and output the received data and an indicator (byte-aligned indicator) that may indicate that the received data may be byte aligned. The alignment logic may receive data bits or error bits from single de-serializer 114 to perform byte alignment. In some cases, the toggling pattern (first data) may be stored in FIFO structure 112. In other embodiments, the toggling pattern may be loaded from other structures for performing byte alignment. The matching logic may receive the received data and the indicator from the alignment logic. The matching logic may match the error bits with data bits of the second data stored in register 116 (i.e., the locally stored predefined patterns). The matching logic may output cycle-to-cycle matched error bits and data bits to a tap adjustment algorithm. For example, the matching logic may output the cycle-to-cycle matched error bits and data bits to an SSLMS core that implements an SSLMS algorithm to correlate the error and data bits for calibrating or otherwise adjusting one or more DFE taps 120.

In at least one embodiment, the data path of analog circuitry 106 may include an analog front-end (AFE) circuit, a data slicer, an error slicer, and a multiplexer. The AFE circuit may receive the signal from memory device 104 over data pin 122. The AFE circuit may provide the signal to the data slicer and the error slicer. The outputs of the data slicer and the error slicer may be coupled to the multiplexer. The multiplexer may select either an output of the data slicer or an output of the error slicer. The multiplexer may select the output of the error slicer in a training mode in which the DFE taps 120 may be calibrated (also referred to as trained or adjusted). The multiplexer may select the output of the data slice in a normal mode, such as after DFE taps 120 may be calibrated. The data path may include multiple data and error slicers, each slicer having a tap, such as illustrated in FIG. 2.

Figure 2:
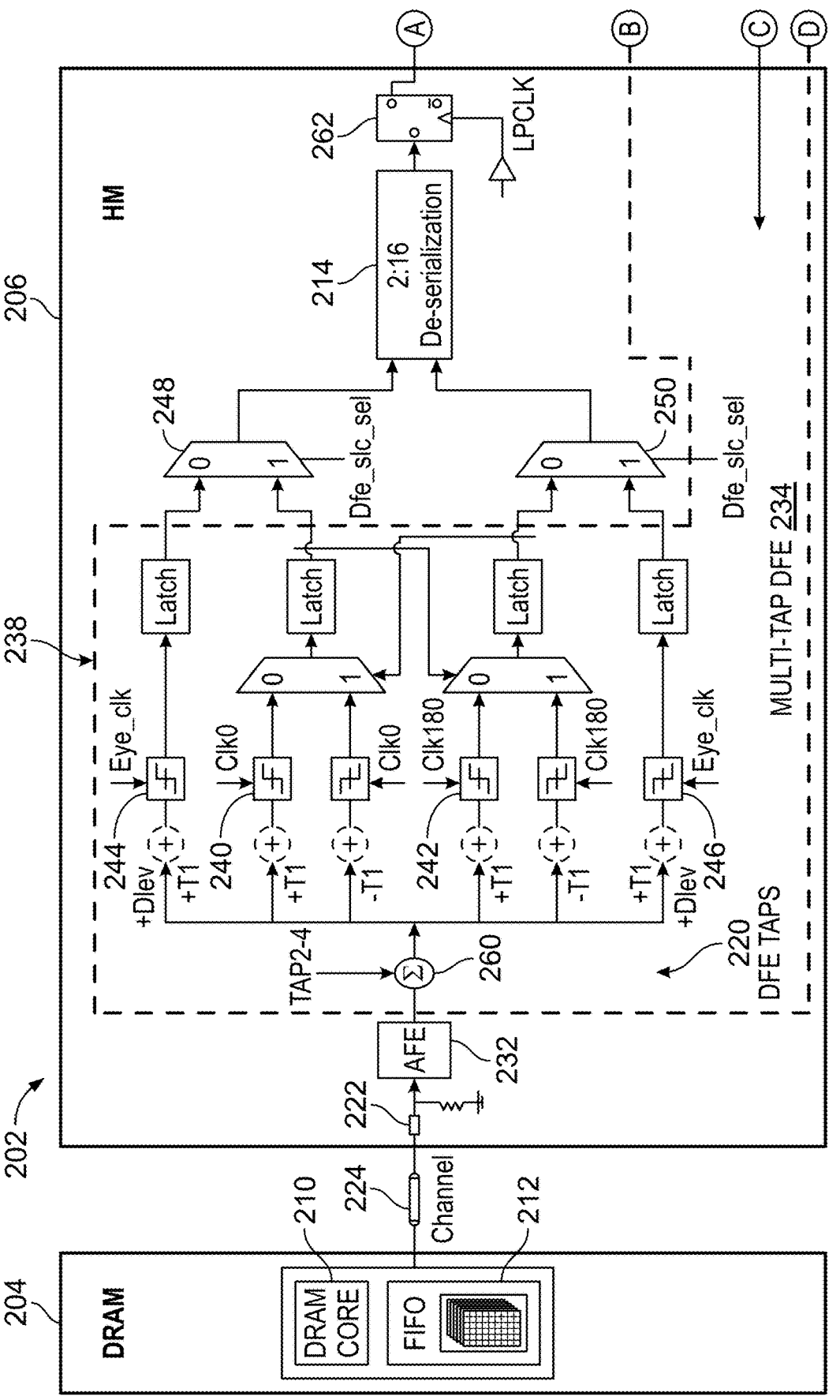
FIG. 2 is a block diagram of a memory system with a multi-tap DFE and digital logic to calibrate the multi-tap DFE according to at least one embodiment.
Figure 2:
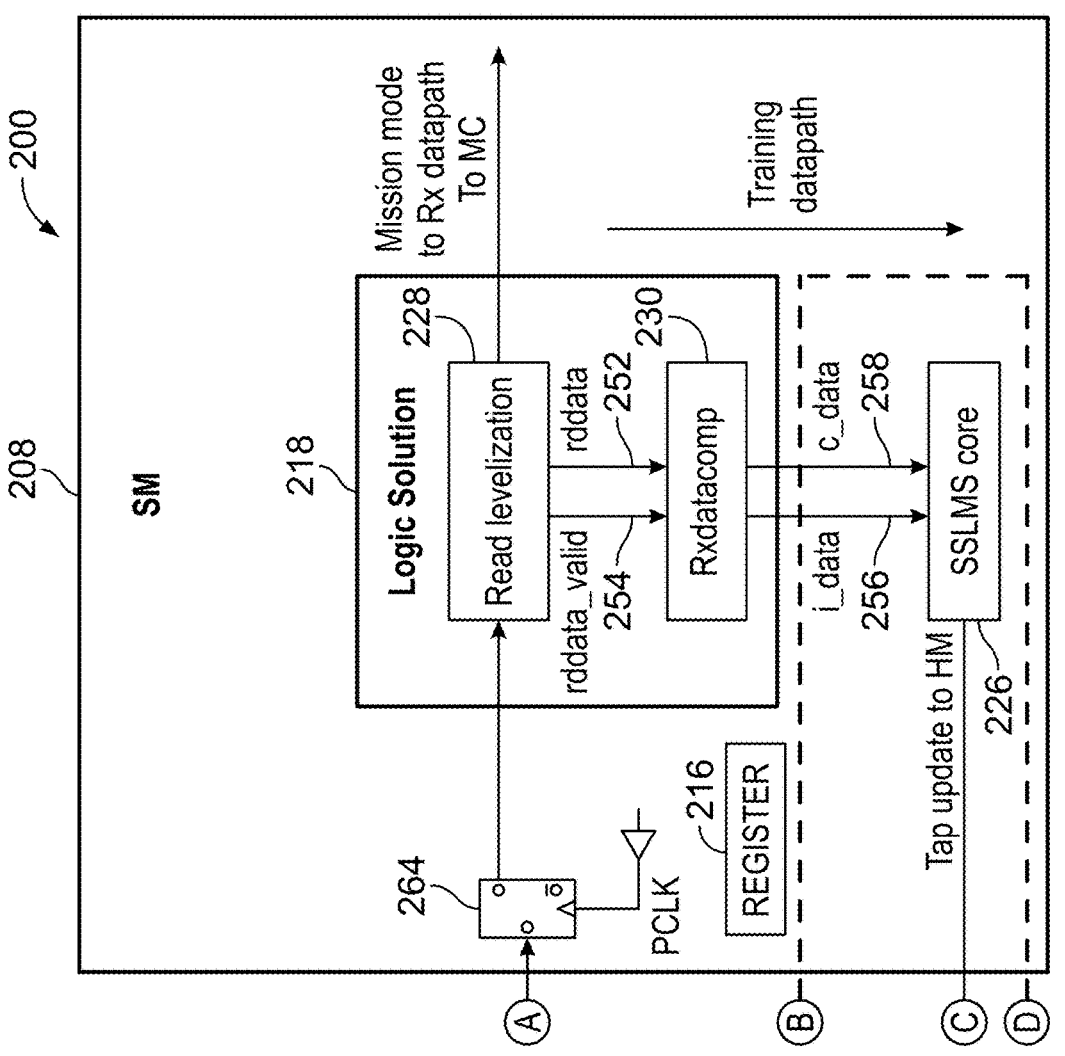

FIG. 2 is a block diagram of a memory system 200 with a multi-tap DFE and digital logic to calibrate the multi-tap DFE according to at least one embodiment. Memory system 200 may include memory controller 202 and DRAM device 204. Memory controller 202 may be coupled to DRAM device 204 with a command and address bus and data bus having multiple channels, although only one channel 224 may be illustrated being coupled to DQ pin 222. DRAM device 204 may include DRAM core 210 and FIFO structure 212. As described in more detail herein, FIFO structure 212 may store multiple predefined patterns, also called training patterns, for training multi-tap DFE 234. In other embodiments, the multiple training patterns may be stored in other structures of the DRAM device 204. In at least one embodiment, FIFO structure 212 may be a separate structure from the memory DRAM core 210. In other embodiments, the training patterns may be stored in the memory DRAM core 210. The multi-tap DFE 234 may include SSLMS core 226 in digital circuitry 208 and multiple DFE taps 220 and summer 260 in analog circuitry 206. Multi-tap DFE 234 may employ DFE taps 220 (also referred to as filter coefficients) to estimate the interference caused by multiple previously transmitted symbols. Each tap may correspond to a different delay element in the filter, representing a different symbol period in the past. The summer 260 may add the other taps2-4, whereas the following may describe the tap1. The filter coefficients associated with each tap may be adaptively adjusted by SSLMS core 226 (or other tap adjustment algorithm) to minimize the residual interference. Multi-tap DFE 234 may operate in a two-step process: feedforward and feedback. Multi-tap DFE 234 may be half-rate first tap (tap1) speculative. DFE 234 may use tap1 speculation to ease the tap1 timing requirements. This means that multi-tap DFE 234 may apply the tap 1 correction on the current received signal for both possible cases of the previous symbol being 1 and the previous symbol being 0 and may then slice the correction for each case. The sign of the previous symbol may then be used to select the correct result. Only tap1 may be speculative in nature. Further, the estimated symbol sequence may be passed through another set of taps (e.g., taps2-4) to create an estimate of the interference that may be caused on the current symbol by the previous symbols. This estimated interference or other taps corrections may be applied on the current received signal to further reduce the ISI. This estimated interference may be subtracted from the current received signal, further reducing the ISI. The tap coefficients of the multi-tap DFE 220 (e.g., tap1-tap4) may be adapted using algorithms such as the least mean squares (LMS), SSLMS, or the like, to continually update and optimize their values based on the received signal characteristics.

The single data path includes AFE circuit 232 that may receive a signal at DQ pin 222 over the channel 224 from the DRAM device 204. The AFE circuit 232 may provide the signal to the summer 260 before applying tap1 correction and before being fed into set of slicers 238 for the first tap (tap1). Set of slicers 238 may include first data slicer 240, second data slicer 242, first error slicer 244, and second error slicer 246. The set of slicers 238 may include additional data slicers and additional taps, such as the third and fourth data slicers illustrated in FIG. 2. First multiplexer 248 may be coupled to the first data slicer 240 and the first error slicer 244. First multiplexer 248 may select an output of first data slicer 240 or first error slicer 244 based on a select signal. The select signal may be activated in one or more modes where the error bits may be provided to 2:16 de-serializer block 214. Second multiplexer 250 may be coupled to second data slicer 242 and second error slicer 246. The second multiplexer 250 may select an output of second data slicer 242 or second error slicer 246 based on the selected signal. In at least one embodiment, the first multiplexer may select an output of first error slicer 244, and second multiplexer 250 may select an output of second error slicer 246 in a training mode in which DFE taps 220 may be calibrated. 2:16 de-serializer block 214 may receive the outputs of first multiplexer 248 and second multiplexer 250. In this embodiment, 2:16 de-serializer block 214 may output 16 bits from the 2 signals. In other embodiments, the de-serializer block may be a 2:N de-serializer block, where N may be a positive integer greater than two. 2:16 de-serializer block 214 may provide the received data (e.g., error bits) to digital circuitry 208. It should be noted that only one data path of memory controller 202, which may be coupled to channel 224, may be illustrated in FIG. 2. Analog circuitry 206 and digital circuitry 208 may be replicated for additional data paths for other channels.

In at least one embodiment, digital logic 218 may include SSLMS core 226 that implements the SSLMS algorithm. Digital logic 218 may include alignment logic 228 and matching logic 230. Alignment logic 228 may perform byte alignment on the received data from analog circuitry 206. Alignment logic 228 may output the received data 252 (rddata) and indicator 254 (also referred to as valid indicator (rddata_valid) or byte-aligned indicator) that may indicate that the received data (rddata) may be byte aligned. When the training data path may be enabled during the training mode in which DFE taps 220 may be calibrated, received data 252 may include error bits received from 2:16 de-serializer block 214. Matching logic 230 may receive the received data 252 and indicator 254 from the alignment logic 228. Matching logic 230 may match the error bits with data bits of the second data stored in register 216. Register 216 may be one or more registers. Register 216 may store a copy of the predefined patterns stored in the FIFO structure 212. Matching logic 230 may output error bits 256 and data bits 258 to SSLMS core 226 for adjusting DFE taps 220 (e.g., correlating the data and error bits). Error bits 256 and data bits 258 may be matched cycle-to-cycle error and data bits.

In at least one embodiment, custom patterns may be loaded into FIFO structure 212. These same patterns may be stored in register 216 in digital circuitry 208. Since the data path has only one de-serialization block, only error bits may be fed to digital circuitry 208 during tap adaptation. The data bits may be then picked from register 216. In at least one embodiment, digital logic 218 may perform byte levelization operations and counter operations to match error bits coming from analog circuitry 206 with data bits taken from register 216 in the digital circuitry 208. The read levelization may be performed by comparing the received data with first data stored in register 216. The first data may be a toggling pattern. DFE taps 220 may be calibrated by comparing the received data with second data stored in register 216. Digital circuitry 208 may use a counter to select the predefined patterns from register 216. The data bits and error bits may be used by the tap adjustment algorithm (e.g., SSLMS algorithm) to adapt DFE taps 220 and improve eye margins, as described in more detail below. The single data path architecture may help save on area and power of analog circuitry 206. In at least one embodiment, memory control- ler 202 may be implemented in a GDDR6 PHY. In other embodiments, memory controller 202 may be implemented in DDR5, LPDDR5, LPDDR5x memory PHY, or the like.

In some embodiments, the output signal emerging from 2:16 de-serializer block 214 may pass through a first flip- flop (e.g., latch 262) to latch and hold data bits or error bits in the data path to 2:16 de-serializer block 214. Latch 262 may be aligned to a parallel clock cycle (lpclk). The output of latch 262 may be sampled by a second flip flop (e.g., flip-flop 264) that may be aligned to a different parallel clock cycle (pclk). The output of flip-flop 264 may then be fed into alignment logic 228.

Figure 3:
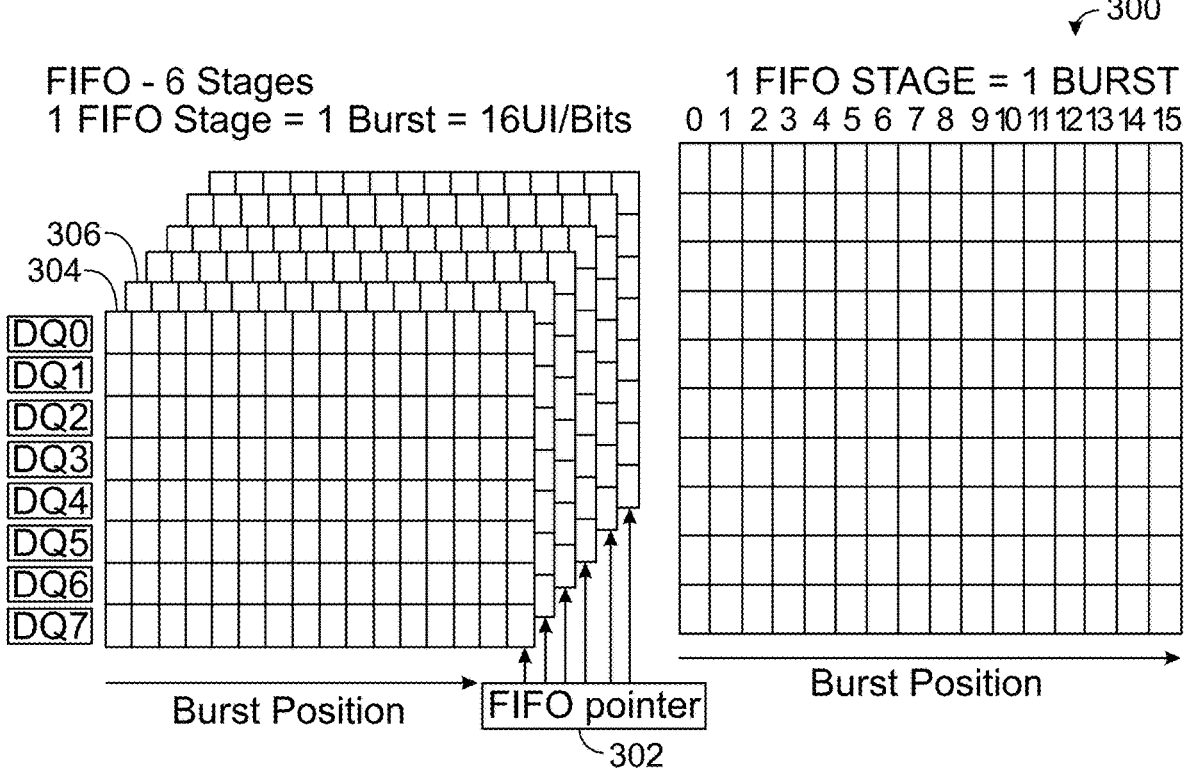
FIG. 3 illustrates a FIFO structure having multiple training patterns according to at least one embodiment.

FIG. 3 illustrates a FIFO structure 300 having multiple training patterns according to at least one embodiment. FIFO structure 300 may be stored in a memory device, such as DRAM device 204. FIFO structure 300 may provide six FIFO stages to facilitate training of the DFE taps. Each FIFO stage may store up to 16 UI/bits of custom pattern for each DQ pin. Meaning each row in a FIFO stage may be reserved for a DQ pin and may store up to 16 bits of the pattern. Since there may be six FIFO stages, a maximum of 96 bits of pattern may be stored for each DQ pin. The patterns loaded into FIFO structure 300 may be generated knowing the channel characteristics and considering other non-ideal effects, such as noise and crosstalk (xtalk) of a memory system. As such, the patterns may contain the worst possible sequences of 1's, and 0's to adjust the DFE taps. In this embodiment, there may be six stages, and one burst of data may be 16 UI/bits. Upon a single read command by the memory controller, the memory controller may receive 16 UI/bits of the patterns, corresponding to one FIFO stage data, from the DRAM device. FIFO pointer value 302 may identify from which FIFO stage the data may be read. For example, value 0 for FIFO pointer value 302 may corre- spond to first FIFO stage 304, and value 1 for FIFO pointer value 302 may correspond to a second FIFO stage 306, and so on. For first FIFO stage 304, the memory controller receives the first 16 UI/bits. For the second FIFO stage 306, the memory controller may receive the second 16 UI/bits.

As described above, digital logic 218 may perform byte alignment and matching. Additional details of the byte alignment may be illustrated and described below with respect to FIG. 4. Additional details of matching may be illustrated and described below with respect to FIG. 5 to FIG. 6.

Figure 4:
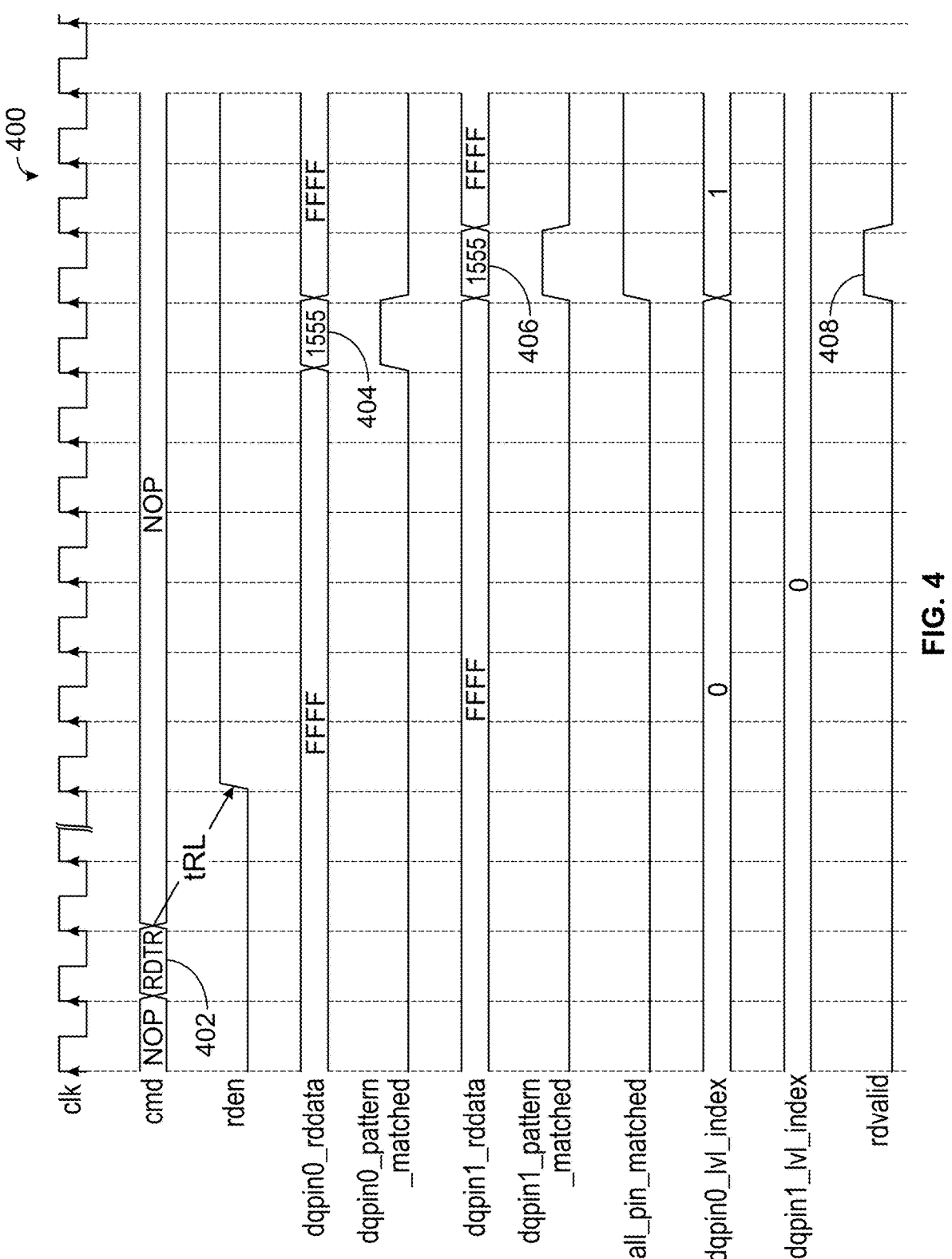
FIG. 4 is a timing diagram illustrating byte alignment according to at least one embodiment.

FIG. 4 is a timing diagram illustrating byte alignment 400 according to at least one embodiment. It should be noted that different DQ pins may have different channel delays. So, when all the DQ pins parallel data is received at the digital circuitry, they may not be aligned to the same parallel clock cycle (pclk). For example, any DQ pin's data may be one or two clock cycles delayed or ahead when compared with respect to other DQ pin data. As described above, the alignment logic (also referred to as byte levelization logic) may help align or level all the DQ pins parallel data. The byte alignment may be performed by matching the received data with the expected pattern and aligning the matched data received on each DQ pin to be in the same cycle for all DQ pins. Since byte alignment/levelization may be performed before the DFE taps may be adapted, a pattern that may be least affected by ISI should be used, such as a toggling pattern like 'b1010101010101000. This toggling pattern may be loaded into the FIFO structure. After loading the toggling pattern, one read command 402 may be issued. Parallel data 404 may be received at the digital circuitry in response to the read command 402 'h1555. The parallel data 404 may be received on a first pin (dqpin0) and may arrive one cycle early compared to parallel data 406 received on a second pin (dqpin1). Thus, parallel data 404 may be delayed or shifted by one cycle to align with parallel data 406. A read valid signal 408 may be generated in the same cycle (pclk cycle) where all the DQ pins parallel data may be aligned. The read valid signal 408 may be used as a reference point for continuously tracking the FIFO boundary. The continu- ous tracking of the FIFO boundary may help match error and data bits during tap adaptation, as described in more detail below.

It should be noted that byte alignment/levelization in prior solutions may be performed after training as part of mission mode operation. The byte alignment/levelization described herein may be part of training in a training mode. As described herein, byte alignment/levelization alone may not address matching received data in the form of error bits to the corresponding data bits in the locally stored predefined patterns. The byte alignment/levelization may provide a reference point in the form of read valid signal 408 to indicate a start of a FIFO burst. Continuously reading the predefined patterns from the FIFO while training may be needed and thus continuously tracking of FIFO boundary may be needed. Byte alignment along with matching logic helps to continuously track the FIFO boundary and help match received data in the form of error bits to the corre- sponding data bits in the locally stored predefined patterns for use by the tap adjustment algorithm. Counter-based logic may be used to continuously track the FIFO boundary using read valid signal 408, such as illustrated and described below with respect to FIG. 5.

Figure 5:
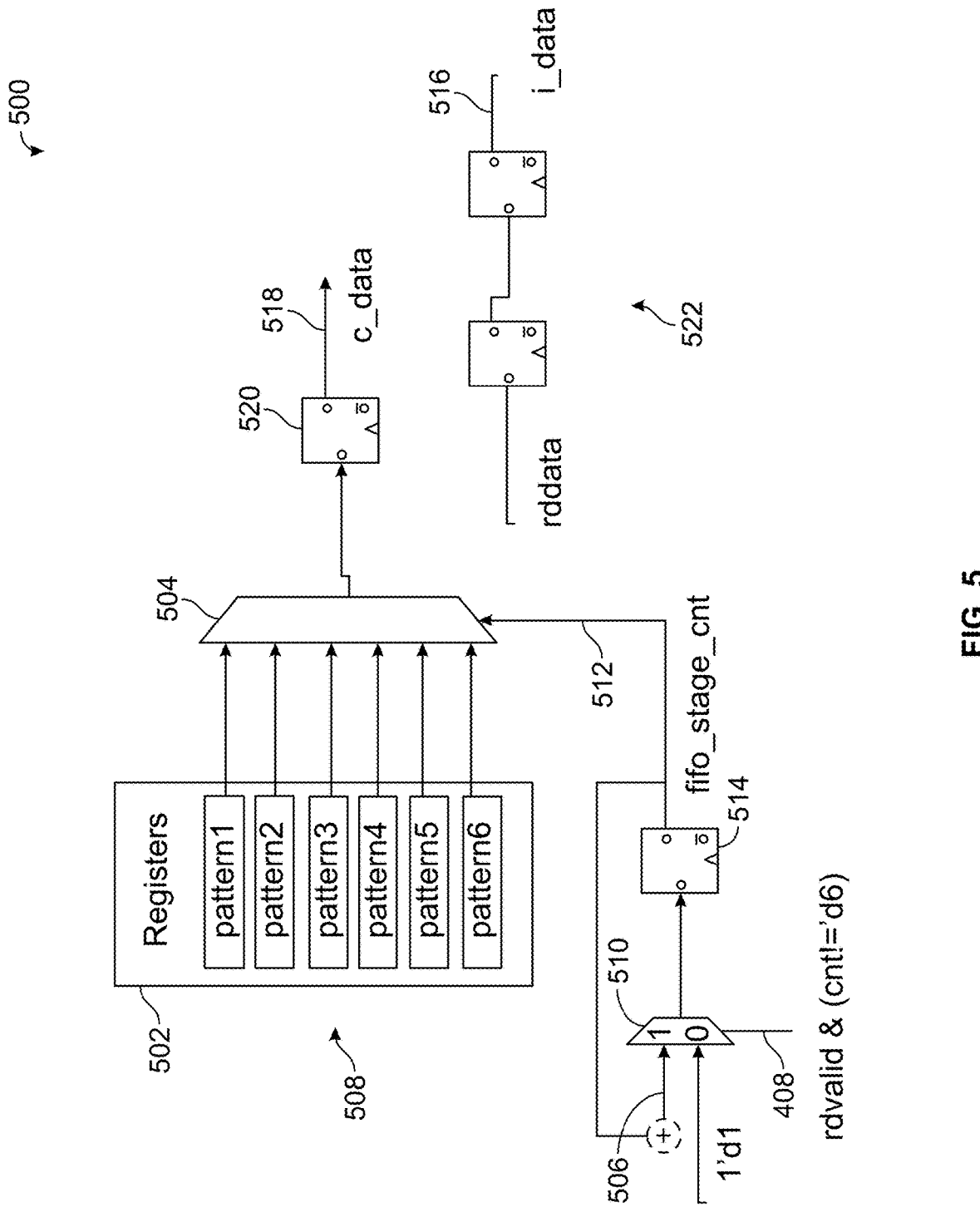
FIG. 5 is a schematic diagram of matching logic for matching error and data bits for tap adaptation of multiple DFE taps according to at least one embodiment.

FIG. 5 is a schematic diagram of matching logic 500 for matching error and data bits for tap adaptation of multiple DFE taps according to at least one embodiment. As described above, the memory controller may continuously read data while training. Matching logic 500 may be coun- ter-based logic that provides FIFO stage count 512 to a multiplexer 504 that may select one of multiple predefined patterns 508 stored in a register set 502. The FIFO stage count 512 may correspond to FIFO pointer value 302 used to read the respective pattern from the FIFO structure on the DRAM device. In this example, there may be six stages. Each of the six predefined patterns may be stored in a register of register set 502. Alternatively, the patterns may be stored in distinct locations of a single register. In the illustrated embodiment, matching logic 500 may include a multiplexer 510, which may receive a count value of 506, from 1 to 6 as one input, or a count value of 1 instead of the count value 506. The count value 506 may be selected by the multiplexer 510 in response to receiving the read valid signal 408 from the alignment logic (and the count value not being six). The output of the multiplexer 510 may be provided to a flip-flop 514 that outputs the FIFO stage count 512 on a clock cycle. The FIFO stage count 512 may be fed back to a summer that increments the count value 506 provided to the multiplexer 510. If the read valid signal 408 may not be activated, the FIFO stage count 512 may have the count value of 1 instead of the count value 506. In this manner, FIFO stage count 512 may be provided to select one of the predefined patterns 508 when the read valid signal 408 may be activated. The read valid signal 408 may indicate a start of a FIFO burst (i.e., the FIFO burst boundary). Since the patterns may be continuously read from the FIFO structure, matching logic 500 may match error bits 516 (i_data), corresponding to the data bits received from the DRAM device, and data bits 518 read from the register set 502. Matching logic 500 may output the cycle-to-cycle matched error bits 516 and data bits 518 to the tap adjustment algorithm (e.g., SSLMS algorithm) for adjusting one or more DFE taps.

In at least one embodiment, matching logic 500 may include flip-flops 520 (only one shown) to output data bits 518 of the predefined patterns at a given clock cycle. Matching logic 500 may include one or more stages flip-flops 522 to delay the error bits 516 to match the corresponding data bits 518 in the same clock cycle.

Figure 6:
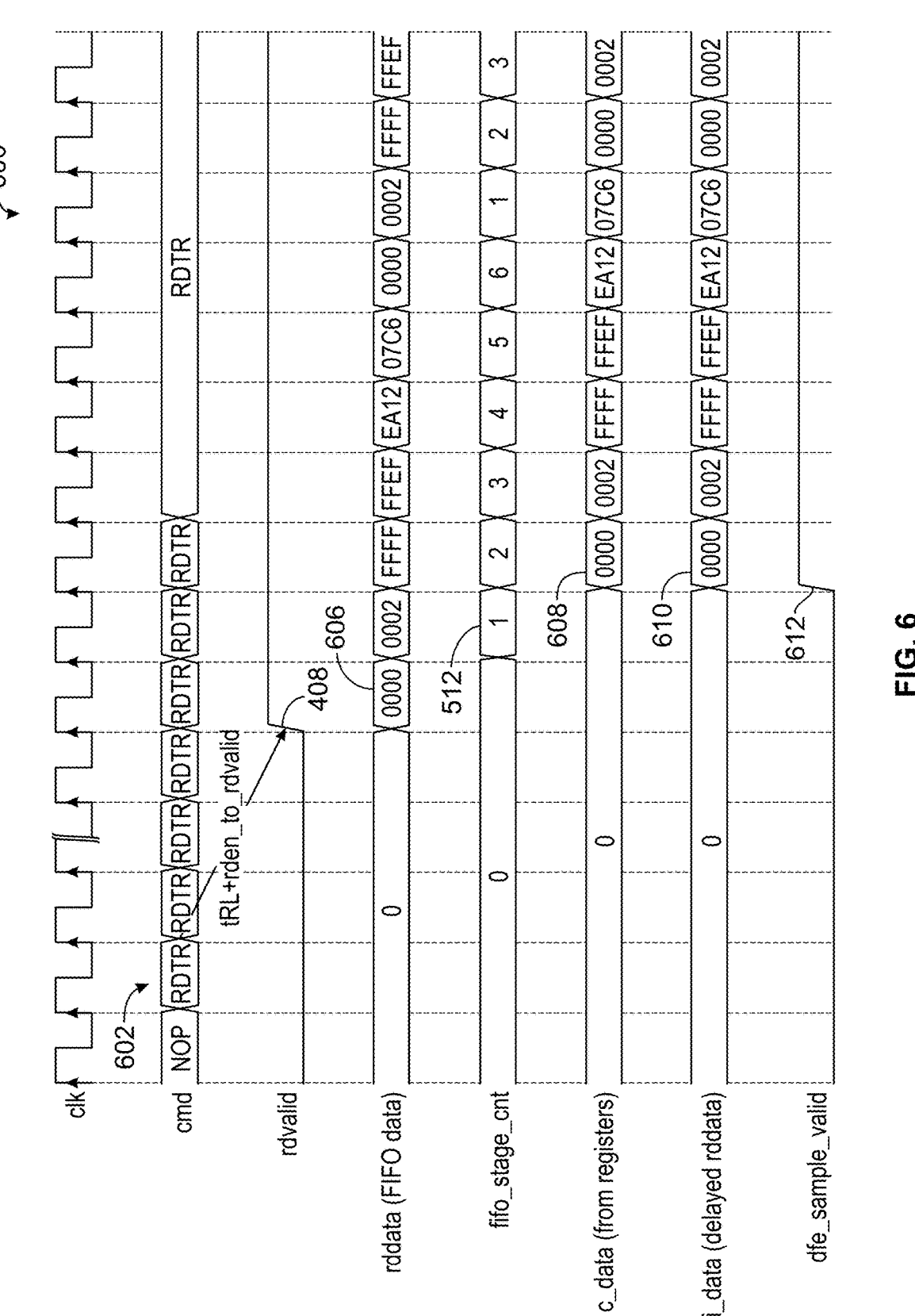
FIG. 6 is a timing diagram illustrating matching error bits and data bits from a set of training patterns stored in a register according to at least one embodiment.

FIG. 6 is a timing diagram 600 illustrating matching error bits and data bits from a set of training patterns stored in a register according to at least one embodiment. For matching, the memory controller performs continuous read operations 602. The byte alignment logic of memory controller may generate read valid signal 408 to indicate a FIFO burst boundary at which received data 606 may be received from the FIFO structure. The matching logic may start to increment FIFO stage count 512 from 0 to 1 and may continue to count so long as read valid signal 408 may be activated. FIFO stage count 512 may sequentially select the predefined patterns stored in the register(s) and outputs parallel data 608 in the same cycle as parallel data 610, representing the error bits corresponding to received data 606. When parallel data 608 and parallel data 610 match, the matching logic may output valid DFE sample indicator 612. Parallel data 608, 610, and valid DFE sample indicator 612 may be provided to the tap adjustment algorithm (e.g., SSLMS core that implements the SSLMS algorithm).

Figure 7:
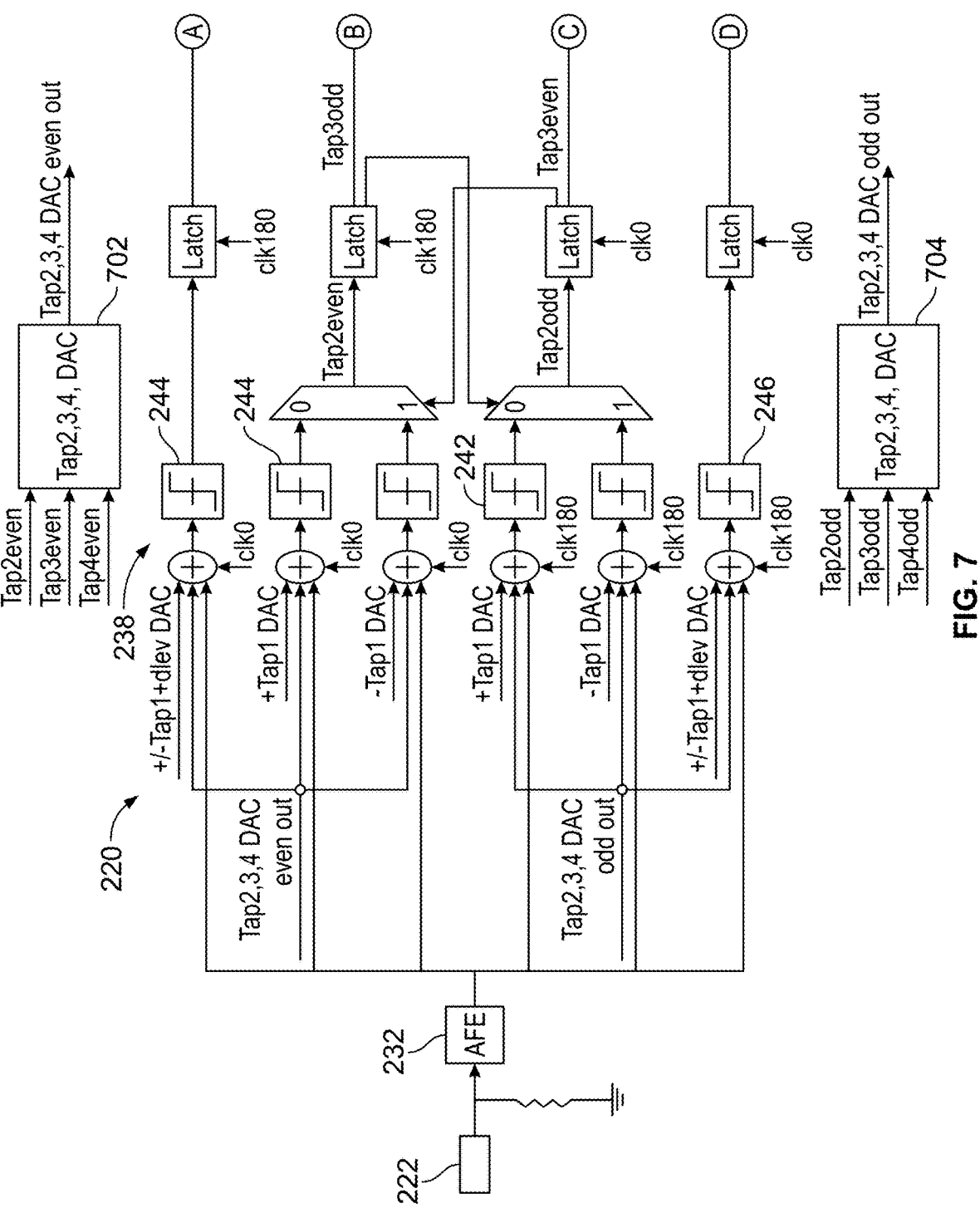
FIG. 7 is a block diagram of a memory system with a multi-tap DFE and a single data path with a de-serializer block according to at least one embodiment.
Figure 7:
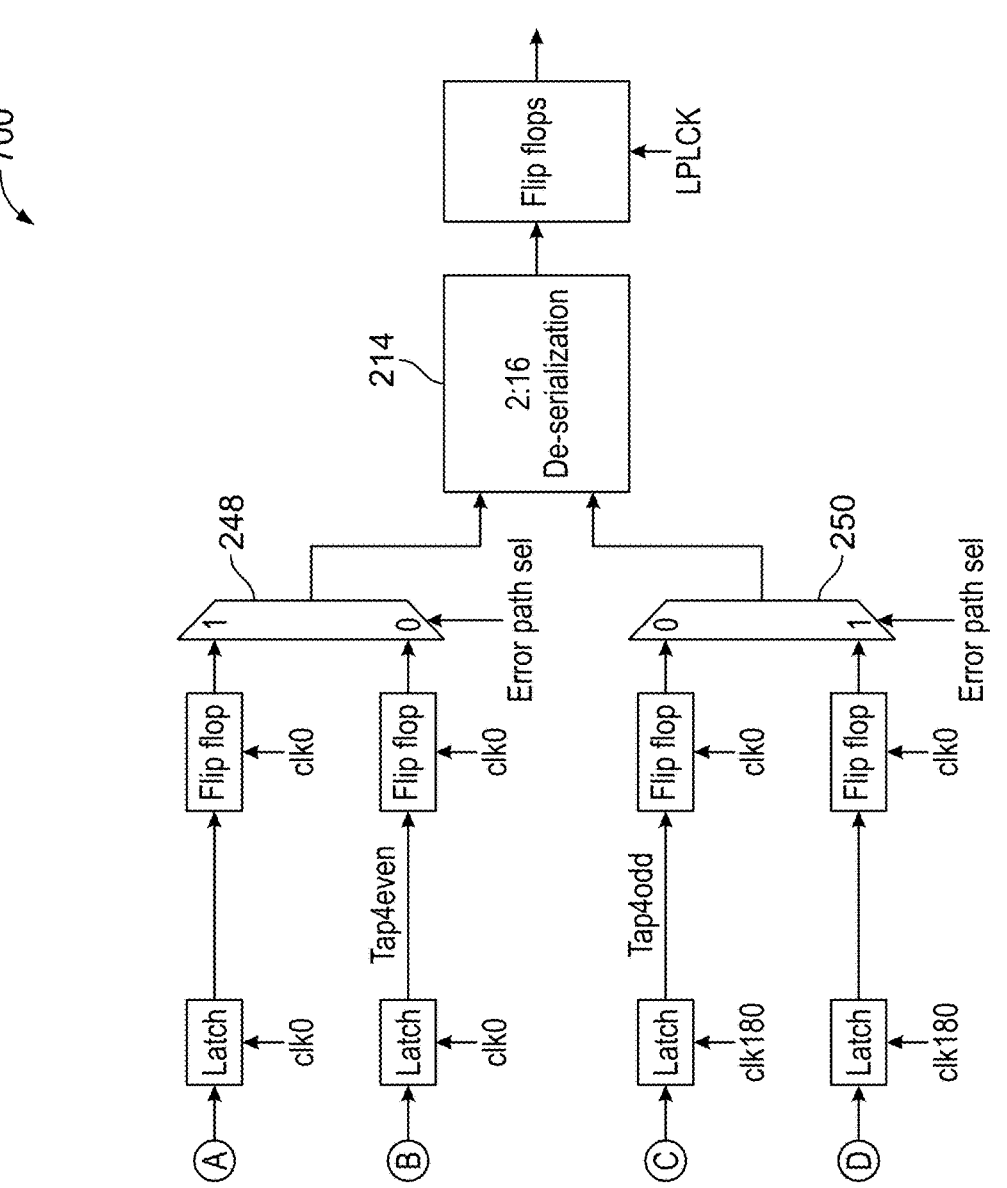

FIG. 7 is a block diagram of a memory system 700 with a multi-tap DFE and a single data path with a de-serializer block according to at least one embodiment. Memory system 700 may be similar to the memory system 200 of FIG. 2, as noted with similar reference numbers except as noted herein. Memory system 700 may include a multi-tap DFE similar to multi-tap DFE 234, except with more details of DFE taps 220. A first digital-to-analog converter (DAC) 702 may receive digital values for the even tap coefficients and provide the corresponding analog signals input into certain summation blocks preceding slicers 238, including the data and error slicers described above. Second DAC 704 may receive digital values for the odd tap coefficients and provide corresponding analog signals input into certain summation blocks. The multi-tap DFE architecture used here may be half-rate tap1 speculative. Since the DFE (receiver) may be half-rate, the DFE topology may have an even path (with even data and error slicers) and an odd path (with odd data and error slicers). The sampling clock of even and odd slicers may be 180 degrees apart in phase. Further, since tap1 may be speculative in nature, in each half of the DFE (even and odd path of DFE), the data signal or received signal may be split into two paths. One path may subtract the value of tap1 (Tap1−) from the data signal or received signal assuming the previous estimated symbol was a 1 and the other path may add the value of tap1 (Tap1+) to the data signal or received signal assuming the previous estimated symbol was a 0. The sliced output of path Tap1+ may be selected if the previous bit is a 0, and the sliced output of path Tap1− may be selected if the previous bit is a 1. The DFE may generate error bits used for tap adaptation. Error slicers of DFE may generate the error bits. Error slicers may operate or slice the received signal at a higher threshold DLEV compared to data slicers. DLEV may be used to designate the threshold level at which error slicers operate. This DLEV may be the amplitude of the main cursor of the received signal. As illustrated in FIG. 7, additional latches and flip-flops may be used to latch and hold data bits or error bits in the data path to 2:16 de-serializer block 214. The output of 2:16 de-serializer block 214 may also be sampled by output flip-flops.

Figure 8:
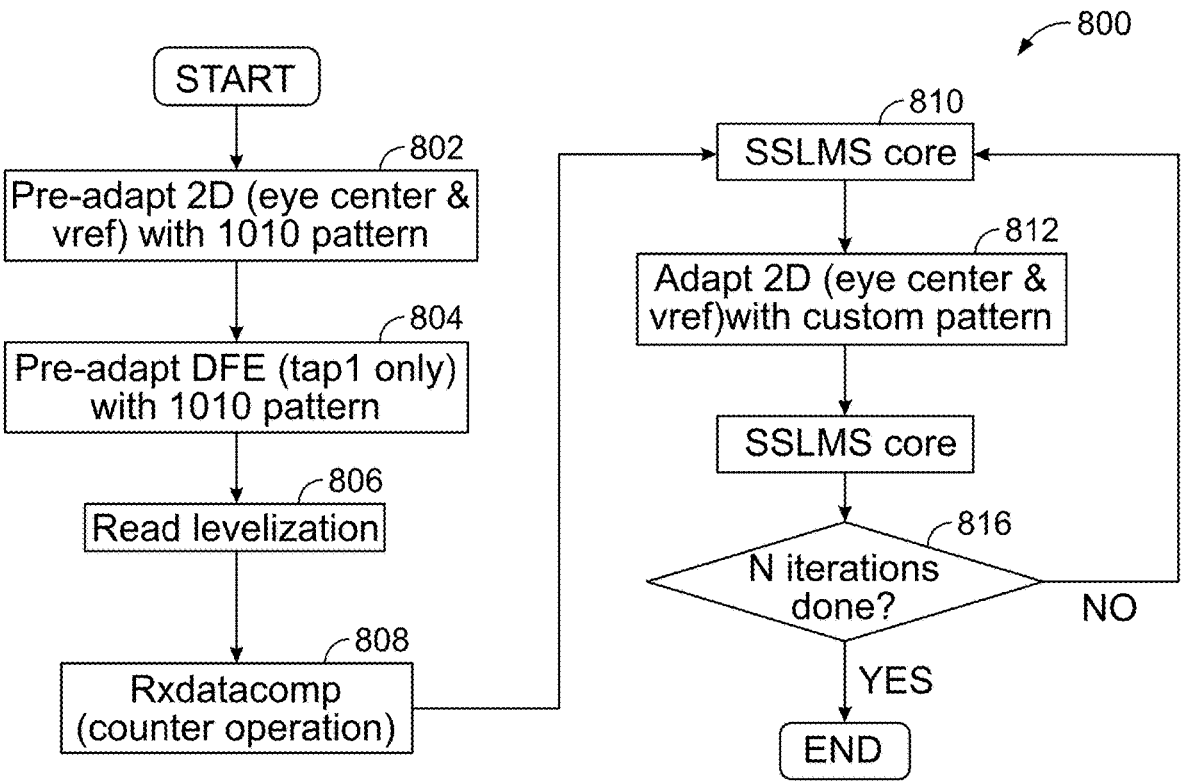
FIG. 8 is a flow diagram of a DFE training method according to at least one embodiment.

FIG. 8 is a flow diagram of a DFE training method 800 according to at least one embodiment. Method 800 may be performed by processing logic that may comprise hardware (e.g., circuitry, dedicated logic, programmable logic, microcode, etc.), software (e.g., instructions run on a processing device to perform hardware may be simulation), or a combination thereof. In one embodiment, DFE training method 800 may be performed by the receiver circuit 118 of FIG. 1. In another embodiment, DFE training method 800 may be performed by the digital circuitry 108 of FIG. 1. In another embodiment, DFE training method 800 may be performed by memory controller 202 of FIG. 2. In another embodiment, DFE training method 800 may be performed by digital circuitry 208 of FIG. 2.

Referring to FIG. 8, DFE training method 800 may begin with the processing logic performing pre-adaptation operations to adapt an eye center and a voltage reference (Vref) using a toggling pattern (block 802). The processing logic may perform pre-adaptation operations to adapt a first tap (tap1) only using a toggling pattern (block 804). The processing logic may perform byte alignment/levelization, as described above (block 806). The processing logic may perform matching operations to match error and data bits (block 808) (also referred to as a counter operation when a counter is used to select the training pattern stored in the register). The matched error and data bits may be provided to the SSLMS core (block 810). The processing logic of the SSLMS core may receive the matched error and data bits (block 810) and adapt the DFE taps. The processing logic may perform adaptation operations to adapt the eye center and the voltage reference (Vref) using the custom patterns (block 812). This may be done over N iterations. At block 816, the processing logic may determine if N iterations have been completed. If not, the processing logic returns to block 810 to repeat the next iteration. When the N iterations have been completed, the processing logic ends the DFE training method 800. The results of the DFE training method 800 may be illustrated in the eye diagrams of FIG. 9.

Figure 9:
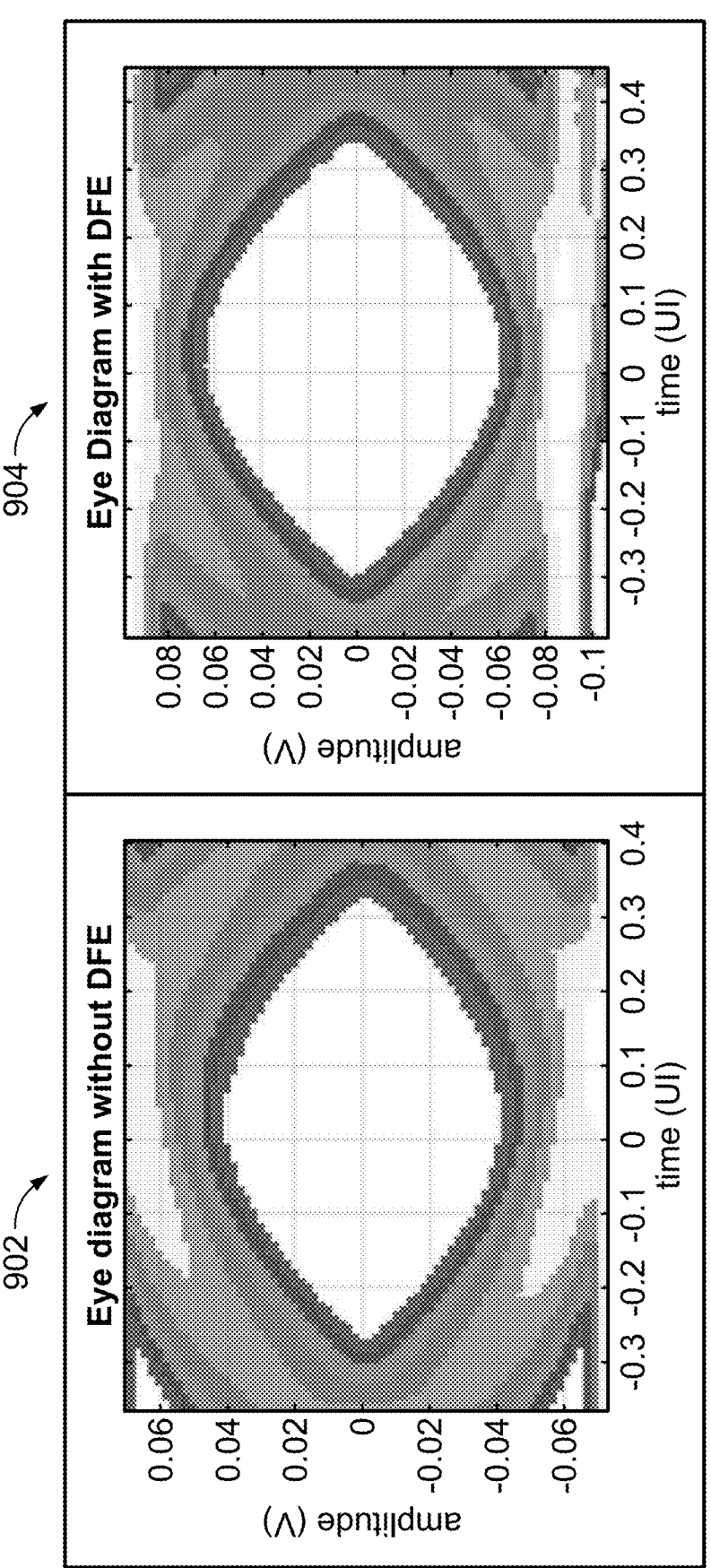
FIG. 9 illustrates an eye diagram without DFE training and an eye diagram with DFE training according to at least one embodiment.

FIG. 9 illustrates an eye diagram without DFE training 902 and an eye diagram with DFE training 904 according to at least one embodiment. Voltage noise may be added (e.g., supply noise and crosstalk, etc.) to clearly show the margin achieved using the DFE training described herein.

FIG. 10 is a flow diagram of method 1000 for calibrating multiple DFE taps according to at least one embodiment. Method 1000 may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 1000 is performed by the receiver circuit 118 of FIG. 1. In another embodiment, method 1000 may be performed by the digital circuitry 108 of FIG. 1. In another embodiment, method 1000 may be performed by the memory controller 202 of FIG. 2. In another embodiment, method 1000 may be performed by the digital circuitry 208 of FIG. 2.

Referring to FIG. 10, method 1000 may begin with the processing logic receiving, from a DRAM device, a first training pattern in a first stage of a training mode of the receiver circuit (block 1002). At block 1004, the processing logic may perform byte alignment using the first training pattern in the first stage. At block 1006, the processing logic may receive a plurality of training patterns in a second stage of the training mode. At block 1008, the processing logic matches error bits, corresponding to the first data bits of the plurality of training patterns received from the DRAM device, with the second data bits of a copy of the plurality of training patterns stored at the receiver circuit. At block 1010, the processing logic may calibrate a plurality of DFE taps of the receiver circuit using the error bits and the second data bits.

In further embodiments, the processing logic may perform other operations described above.

Figure 11:
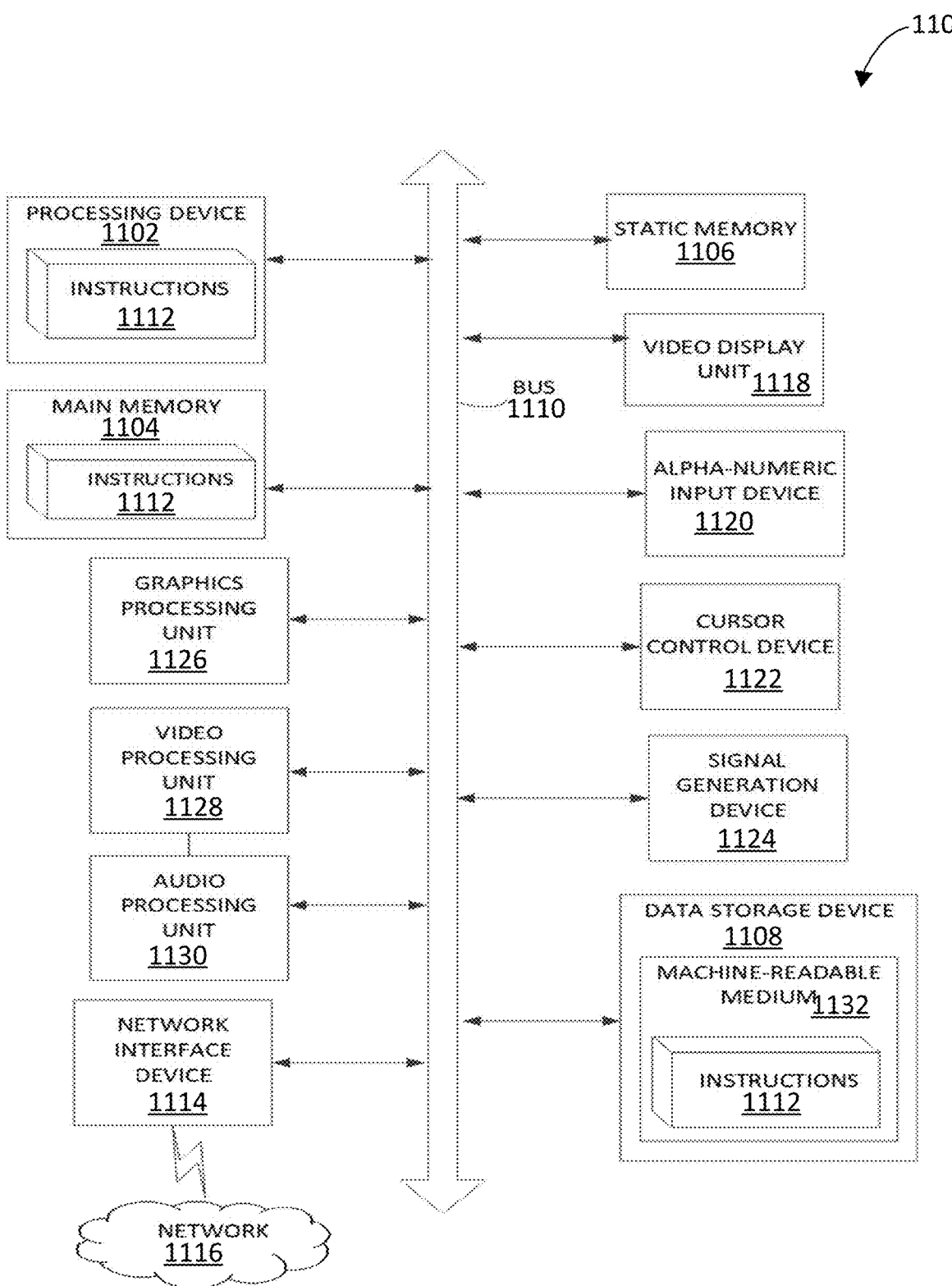
FIG. 11 illustrates a block diagram of an embodiment of a computer system in which some embodiments of the disclosure may operate.

FIG. 11 illustrates a block diagram of an embodiment of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine may be illustrated, the term "machine" may also be taken to include any collection of machines that individually or jointly execute a set (or multiple sets) of instructions to perform any one or more of the methodologies discussed herein.

Example computer system 1100 may include a processing device 1102, main memory 1104 (e.g., read-only memory (ROM), flash memory, dynamic random access memory (DRAM) such as synchronous DRAM (SDRAM) or Rambus DRAM (RDRAM), etc.), static memory 1106 (e.g., flash memory, static random access memory (SRAM), etc.), and data storage device 1108, which may communicate with each other via bus 1110. As described herein, the FIFO structure may be stored in a memory device, such as main memory 1104. Processing device 1102 may include a memory controller to access the memory device. The memory controller may include the logic described herein.

Processing device 1102 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices, such as an application-specific integrated circuit (ASIC), a field programmable gate array (FPGA), a digital signal processor (DSP), a network processor, or the like. Processing device 1102 may be configured to execute instructions 1112 for performing the operations and steps discussed herein.

Computer system 1100 may further include network interface device 1114 to communicate over network 1116. Computer system 1100 also may include video display unit 1118 (e.g., a liquid crystal display (LCD) or a cathode ray tube (CRT)), alpha-numeric input device 1120 (e.g., a keyboard), cursor control device 1122 (e.g., a mouse), signal generation device 1124 (e.g., a speaker), graphics processing unit 1126, video processing unit 1128, and audio processing unit 1130.

Data storage device 1108 may include machine-readable storage medium 1132 (also known as a computer-readable storage medium) on which is stored one or more sets of instructions 1112 or software embodying any one or more of the methodologies or functions described herein. Instructions 1112 may also reside, completely or at least partially, within main memory 1104 and/or within processing device 1102 during execution thereof by computer system 1100, main memory 1104 and processing device 1102 also constituting machine-readable storage media.

In one implementation, instructions 1112 may include instructions to implement functionality as described herein. While machine-readable storage medium 1132 is shown in an example implementation to be a single medium, the term "machine-readable storage medium" may be taken to include a single medium or multiple media (e.g., a centralized or distributed database, and/or associated caches and servers) that store the one or more sets of instructions. The term "machine-readable storage medium" may also be taken to include any medium that is capable of storing or encoding a set of instructions for execution by the machine and that may cause the machine to perform any one or more of the methodologies of the present disclosure. The term "machine-readable storage medium" shall accordingly be taken to include, but not be limited to, solid-state memories, optical media, and magnetic media.

It is to be understood that the above description is intended to be illustrative, and not restrictive. Many other implementations may be apparent to those of skill in the art upon reading and understanding the above description. The scope of the disclosure should, therefore, be determined with reference to the appended claims, along with the full scope of equivalents to which such claims may be entitled.

In the above description, numerous details may be set forth. It may be apparent, however, to one skilled in the art, that the aspects of the present disclosure may be practiced without these specific details. In some instances, well-known structures and devices may be shown in block diagram form, rather than in detail, in order to avoid obscuring the present disclosure.

Some portions of the detailed descriptions above may be presented in terms of algorithms and symbolic representations of operations on data bits within a computer memory. These algorithmic descriptions and representations may be the means used by those skilled in the data processing arts to most effectively convey the substance of their work to others skilled in the art. An algorithm is here, and generally, conceived to be a self-consistent sequence of steps leading to a desired result. The steps may be those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms may be to be associated with the appropriate physical quantities and may be merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein may be not inherently related to any particular computer or other apparatus. Various general-purpose systems may be used with programs in accordance with the teachings herein, or it may prove convenient to construct more specialized apparatus to perform the required method steps. The required structure for a variety of these systems may appear as set forth in the description. In addition, aspects of the present disclosure may be not described with reference to any particular programming language. It may be appreciated that a variety of programming languages may be used to implement the teachings of the present disclosure as described herein.

Aspects of the present disclosure may be provided as a computer program product, or software, which may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

In another embodiment, additional requests that do not require a non-shared random number may be received at the first time. The processing logic provides the first random number to the corresponding cryptographic circuits as well. Similarly, additional requests that require a non-shared random number may be received at the first time. The processing logic may generate a non-shared random number for each of these requests and may provide the respective non-shared random number to only the corresponding cryptographic circuit.

In another embodiment, the processing logic may receive a fourth request from the first cryptographic circuit that may require a non-shared random number at a second time. In this case, the processing logic may generate a non-shared random number and provide it to the first cryptographic circuit in response to the fourth request. Similarly, the processing logic may receive, at the second time or at a third time, a fifth request from the third cryptographic circuit that does not require a non-shared random number. In this case, the processing logic may generate a shared random number to provide to the third cryptographic circuit or provide a shared random number that may have already been generated for other cryptographic circuits that may share the random number.

In some embodiments, when performing some operations, it may be necessary to use one or more arguments (e.g., key-wrapping keys, masks, entropy, IVs) that have a viable lifespan (time, usage count) limitation. This may be problematic when there is a real-time or high throughput requirement upon such operations. In such scenarios, a timely delivery mechanism is required to guarantee the delivery and usage of valid arguments.

Typically, such "fragile" data is delivered sequentially from the data source to each of its destinations. The transfer may include transmitting or delivering the data from the source to a single destination and waiting for an acknowledgment. Once the acknowledgment has been received, the source may then commence the delivery of data to the next destination. The time required to complete all the transfers may potentially exceed the lifespan of the delivered data if there are many destinations or there may be a delay in reception for one or more transfer acknowledgments. This has traditionally been addressed by introducing multiple timeout/retry timers and complicated scheduling logic that may ensure timely completion of all the transfers and identify anomalous behavior.

In at least one embodiment, the situation may be improved by either broadcasting the data to all the destinations at once, similar to a multi-cast transmission in Ethernet. This may decouple the data delivery and acknowledgment without delaying the delivery of data by a previous destination's delivery acknowledgment. These approaches may provide some following benefits, as well as others. Broadcasting the data to all destinations at once may remove any limit to the number of destinations that may be supported. The control logic may be simplified. For example, there may be a single time to track the lifespan of data and a single register to track delivery acknowledgment reception. In one embodiment, an incomplete delivery is simply indicated by the register not being fully populated by 1's (or 0's if the convention is reversed) at the end of the data timeout period.

It is to be understood that the above description is intended to be illustrative and not restrictive. Many other implementations may be apparent to those of skill in the art upon reading and understanding the above description. Therefore, the disclosure scope should be determined with reference to the appended claims, along with the full scope of equivalents to which such claims may be entitled.

In the above description, numerous details may be set forth. It may be apparent, however, to one skilled in the art that the aspects of the present disclosure may be practiced without these specific details. In some instances, well-known structures and devices may be shown in block diagram form rather than in detail to avoid obscuring the present disclosure.

Some portions of the detailed descriptions above may be presented in terms of algorithms and symbolic representations of operations on data bits within a computer memory. These algorithmic descriptions and representations may be the means used by those skilled in the data processing arts to most effectively convey the substance of their work to others skilled in the art. An algorithm is here, and generally, conceived to be a self-consistent sequence of steps leading to the desired result. The steps may be those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms may be to be associated with the appropriate physical quantities and may be merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure may also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein may be not inherently related to any particular computer or other apparatus. Various general-purpose systems may be used with programs in accordance with the teachings herein, or it may prove convenient to construct more specialized apparatuses to perform the required method steps. The required structure for a variety of these systems may appear as set forth in the description. In addition, aspects of the present disclosure may be not described with reference to any particular programming language. It may be appreciated that a variety of programming languages may be used to implement the teachings of the present disclosure as described herein.

Aspects of the present disclosure may be provided as a computer program product, or software, which may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

What is claimed is:

1. A receiver circuit of a physical layer (PHY) of a memory controller, the receiver circuit comprising;

a data path configured to receive a signal from a dynamic random access memory (DRAM) device at a data pin over a channel, the data path comprising a plurality of Decision Feedback Equalizer (DFE) taps and only one de-serializer block configured to produce received data; and a digital logic coupled to the data path, wherein the digital logic is configured to perform byte alignment by comparing the received data with first data stored in a register of the digital logic, wherein the plurality of DFE taps is calibrated by comparing the received data with second data stored in the register, wherein the digital logic comprises a counter configured to select portions of the second data for comparisons with the received data.

2. The receiver circuit of claim 1, wherein the first data comprises a toggling pattern.

3. The receiver circuit of claim 1, wherein the second data comprises a plurality of predefined patterns.

4. The receiver circuit of claim 1, wherein the plurality of DFE taps is calibrated by a Sign-Sign Least Mean Squares (SSLMS) algorithm.

5. The receiver circuit of claim 1, wherein the receiver circuit is configured to continuously read from a first-in-first-out (FIFO) of the DRAM device, the FIFO storing a plurality of predefined patterns, wherein the register is configured to store a copy of the plurality of predefined patterns.

6. The receiver circuit of claim 1, wherein the data path further comprises:

an analog front-end (AFE) circuit configured to receive the signal from the DRAM device;

a data slicer;

an error slicer; and a multiplexer coupled to the data slicer and the error slicer, wherein the multiplexer is configured to select an output of the error slicer in a training mode in which the plurality of DFE taps is calibrated.

7. The receiver circuit of claim 1, wherein the data path further comprises:

an analog front-end (AFE) circuit configured to receive the signal from the DRAM device;

a first data slicer;

a second data slicer;

a first error slicer;

a second error slicer;

a first multiplexer coupled to the first data slicer and the first error slicer; and a second multiplexer coupled to the second data slicer and the second error slicer, wherein the first multiplexer is configured to select an output of the first error slicer and the second multiplexer is configured to select an output of the second error slicer in a training mode in which the plurality of DFE taps is calibrated, wherein the de-serializer block is a 2:N de-serializer block, where N is a positive integer greater than two.

8. The receiver circuit of claim 1, wherein the digital logic further comprises:

a Sign-Sign Least Mean Squares (SSLMS) core that implements an SSLMS algorithm;

an alignment logic configured to perform the byte alignment, the alignment logic is configured to output the received data, and an indicator that indicates that the received data is byte aligned, wherein the received data comprises error bits received from the de-serializer block; and a matching logic configured to receive the received data and the indicator from the alignment logic, the matching logic is configured to match the error bits with data bits of the second data stored in the register, the matching logic is configured to output cycle-to-cycle matched error bits and data bits to the SSLMS core.

9. A receiver circuit comprising:

analog circuitry comprising a single de-serializer and a plurality of Decision Feedback Equalizer (DFE) taps, wherein, during a training mode of the receiver circuit, the analog circuitry is configured to receive a first training pattern in a first stage of the training mode and a plurality of training patterns in a second stage of the training mode; and digital circuitry coupled to the analog circuitry, the digital circuitry comprising a register configured to store a copy of the plurality of training patterns, wherein the digital circuitry is configured to perform byte alignment using the first training pattern in the first stage, wherein, in the second stage, the digital circuitry is configured to match error bits received from the single de-serializer with data bits of the copy of the plurality of training patterns, and wherein, in the second stage, the digital circuitry is configured to calibrate the plurality of DFE taps using the error bits and the data bits.

10. The receiver circuit of claim 9, wherein the digital circuitry further comprises:

a Sign-Sign Least Mean Squares (SSLMS) core that implements an SSLMS algorithm to calibrate the plurality of DFE taps;

an alignment logic configured to perform the byte alignment, the alignment logic is configured to output the error bits and a byte-aligned indicator; and matching logic to receive the error bits and the byte-aligned indicator from the alignment logic, the matching logic to match the error bits with the data bits of the copy of the plurality of training patterns stored in the register, the matching logic is configured to output the matching error bits and data bits to the SSLMS core.

11. The receiver circuit of claim 9, wherein the first training pattern comprises a toggling sequence of bits, and wherein the plurality of training patterns comprises different predefined sequences of bits.

12. The receiver circuit of claim 9, wherein the analog circuitry further comprises:

an analog front-end (AFE) circuit configured to receive a signal from a dynamic random access memory (DRAM) device;

a data slicer;

an error slicer; and a multiplexer coupled to the data slicer and the error slicer, wherein the multiplexer configured is to select an output of the error slicer in a training mode in which the plurality of DFE taps is calibrated.

13. The receiver circuit of claim 9, wherein the analog circuitry further comprises:

an analog front-end (AFE) circuit configured to receive a signal from a dynamic random access memory (DRAM) device;

a first data slicer;

a second data slicer;

a first error slicer;

a second error slicer;

a first multiplexer coupled to the first data slicer and the first error slicer; and a second multiplexer coupled to the second data slicer and the second error slicer, wherein the first multiplexer is configured to select an output of the first error slicer and the second multiplexer is configured to select an output of the second error slicer in a training mode in which the plurality of DFE taps is calibrated, wherein the de-serializer block is a 2:N de-serializer block, where N is a positive integer greater than two.

14. A system comprising:

a dynamic random access memory (DRAM) device comprising a first-in-first-out (FIFO) configured to store a plurality of training patterns, the DRAM device is configured to send first data bits of the plurality of training patterns; and a memory controller coupled to the DRAM device via a channel, wherein the memory controller comprises a register configured to store a copy of the plurality of training patterns, wherein the memory controller comprises:

analog circuitry comprising a single de-serializer and a plurality of Decision Feedback Equalizer (DFE) taps, the single de-serializer is configured to only provide error bits corresponding to the first data bits received from the DRAM device; and digital circuitry coupled to the analog circuitry, wherein the digital circuitry is configured to perform byte alignment using a toggling pattern, and wherein the digital circuitry is configured to calibrate the plurality of DFE taps using the error bits received from the single de-serializer and matching second data bits of the copy of the plurality of training patterns stored in the register.

15. The system of claim 14, wherein the digital circuitry comprises a counter configured to sequentially select each training pattern of the copy of the plurality of training patterns stored in the register.

16. The system of claim 14, wherein the digital circuitry comprises:

a Sign-Sign Least Mean Squares (SSLMS) core that implements an SSLMS algorithm to calibrate the plurality of DFE taps;

an alignment logic configured to perform the byte alignment, the alignment logic is configured to output the error bits and a byte-aligned indicator; and a matching logic configured to receive the error bits and the byte-aligned indicator from the alignment logic, the matching logic is configured to match the error bits with the second data bits of the copy of the plurality of training patterns stored in the register, the matching logic is configured to output the error bits and the matching second data bits.

17. The system of claim 14, wherein the analog circuitry further comprises:

an analog front-end (AFE) circuit configured to receive a signal from the DRAM device;

a first data slicer;

a second data slicer;

a first error slicer;

a second error slicer;

a first multiplexer coupled to the first data slicer and the first error slicer; and a second multiplexer coupled to the second data slicer and the second error slicer, wherein the first multiplexer is configured to select an output of the first error slicer and the second multiplexer is configured to select an output of the second error slicer in a training mode in which the plurality of DFE taps is calibrated, wherein the de-serializer block is a 2:N de-serializer block, where N is a positive integer greater than two.

* * * * *